United States Patent Office.

WILLIAM ADAMSON, OF PHILADELPHIA, PENNSYLVANIA.

Letters Patent No. 73,220, dated January 14, 1868.

IMPROVED HOLDERS FOR DRYING GLUE.

*The Schedule referred to in these Letters Patent and making part of the same.*

TO ALL WHOM IT MAY CONCERN:

Be it known that I, WILLIAM ADAMSON, of Philadelphia, Pennsylvania, have invented an Improvement in Holders on which to Dry Glue; and I do hereby declare the following to be a full, clear, and exact description of the same.

In drying glue, it has heretofore been the practice to place strips or slices of the same, while in a gelatinous state, upon holders, so arranged that the air can gain access to and dry the said strips, these holders consisting of cords or wires extending between bars or cross-frames, and made into nets, or otherwise so arranged as to sustain the gelatinous strips without interfering with the free circulation of the air about the same. During warm weather the strips of glue are apt to sink between the cords, wires, or meshes of these holders, and in drying to adhere so tenaciously to the latter that they can only be detached after steeping in water both holders and glue, so that the latter may be dissolved. The cords also absorb the water of composition when the slices of glue are first placed upon them, and, under some circumstances, this water ferments, and both taints the glue and rots the cords. I have found that the objectionable results may be obviated by the use of a holder, consisting of cords, sheets, net-work, or strips of fabric, or other material, saturated or coated with paraffine, or its equivalent. The glue, owing to the nature of the paraffine, will not adhere to the cords or sheets, while the latter will not absorb moisture, and are therefore always clean, will not injuriously affect the glue, and are preserved from rotting.

Although I prefer to employ paraffine for coating or saturating the material of which the holder is made, stearine, wax, or other equivalent material, which will not combine with glue, and which can be readily applied to the holders, may be employed, and although I prefer to use cords for supporting the sheets of glue, coarse fabrics, or even thin strips of wood, or other material, which will absorb or retain the paraffine, may be employed.

The holders may be coated by passing them through the material while the latter is in a heated and fluid condition, or by applying the same to the holder with a brush.

I claim as my invention, and desire to secure by Letters Patent—

The within-described holder on which to dry glue, the said holder consisting of cords, wires, strips, or sheets of suitable material, saturated or coated with paraffine, or its equivalent, for the purpose specified.

In testimony whereof, I have signed my name to this specification in the presence of two subscribing witnesses.

WM. ADAMSON.

Witnesses:
CHARLES E. FOSTER,
W. J. R. DELANY.